July 4, 1967

J. L. FORMA 3,328,815

BACK PART MOLDING AND HEEL SEAT LASTING MACHINE

Filed Nov. 4, 1964

July 4, 1967   J. L. FORMA   3,328,815
BACK PART MOLDING AND HEEL SEAT LASTING MACHINE
Filed Nov. 4, 1964   6 Sheets-Sheet 4

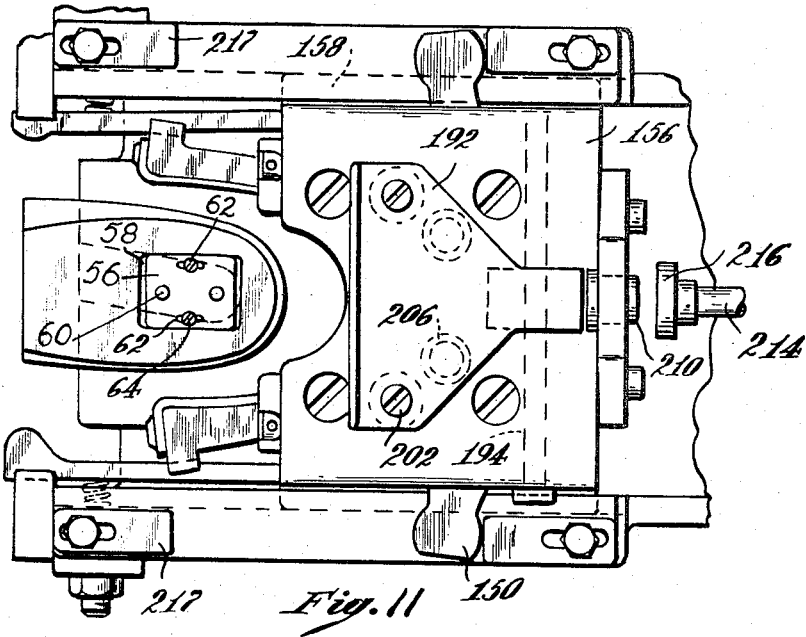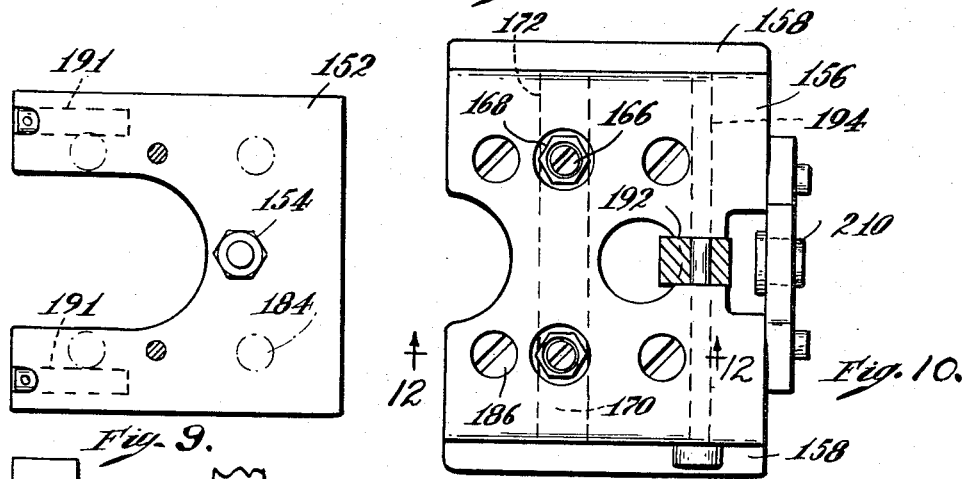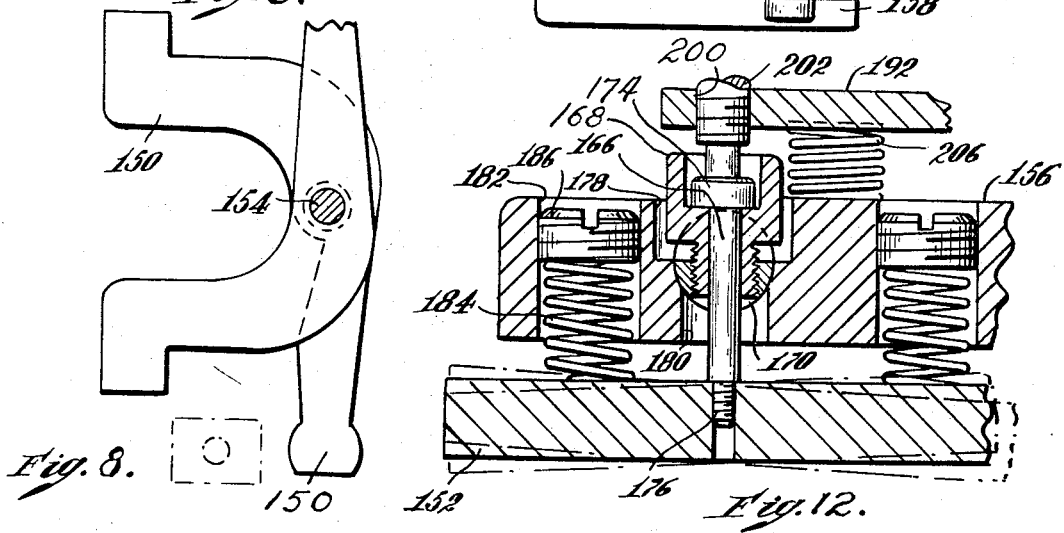

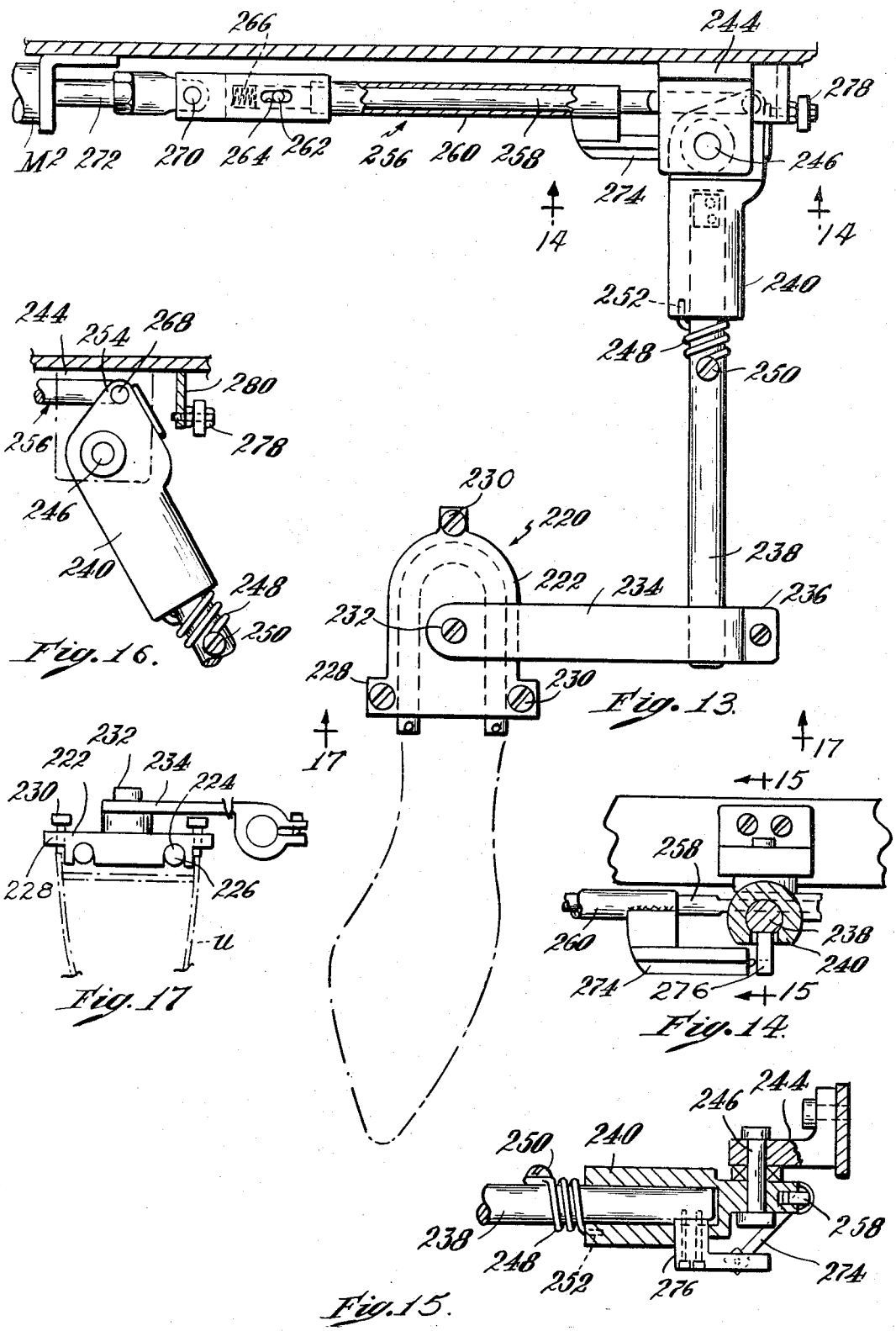

United States Patent Office 3,328,815
Patented July 4, 1967

3,328,815
BACK PART MOLDING AND HEEL SEAT
LASTING MACHINE
James L. Forma, Andover, Mass., assignor to Lowell
Molding Corporation, Lawrence, Mass., a corporation
of Massachusetts
Filed Nov. 4, 1964, Ser. No. 408,807
23 Claims. (Cl. 12—54.3)

This invention relates to machines for shaping the back part of an upper and attaching it to an insole prior to toe lasting and side lasting operations, and has for its principal objects to provide an improved mounting for supporting the male mold part in such a position relative to the female mold part as to compensate for the eccentricity of the shoe bottom; to afford such easy adjustment and replacement of the mounting for the male mold part and for the male mold part itself that the operator will be induced to make the adjustments and replacements whenever good shoe making requires it for different size shoes, right and left shoes, men's, women's and children's shoes, and the like, thereby to obtain more perfect conformity of the upper to the shape of the last; to provide an improved gauge for positioning the upper on the male mold part for optimum molding thereto by the female mold part and for the right amount of lasting margin at the bottom; to provide a gauge which is easy to adjust, will not mar the upper and will not interfere with the movement of the female mold part into engagement with the male mold part and yet will be in its operative position when needed; to provide improved adjustable positioning means on the heel seat surface of the male mold part for holding the insole in its proper position relative to the heel seat surface; to provide improved means for connecting the driving element employed for effecting forward movement of the female mold part toward the male mold part and for quickly and easily replacing the female mold part to match the male mold part; to provide improved support for the female mold part during its forward movement and for causing the female mold part to embrace the male mold part at the optimum time; to provide improved wiper supports for folding the lasting margin inwardly over the insole; which will apply yielding pressure to the margin; to provide means for applying added pressure to the wipers when dealing with stiff and stubborn upper material; and to provide improved means for supporting a heating element for movement into and out of operative position above the insole and for withdrawal from a position above the insole prior to movement of the wipers into operative position.

In accordance with the invention, there is a support on which there are mounted male and female mold parts cooperable, by relative movement of the parts, to mold an upper placed about the male mold part to the shape of the curved lateral surface thereof. The male mold part is preferably stationary in so far as the relative movement is concerned and the female mold part is moved in a straight line from a position rearwardly of the male mold part toward the heel end of the male mold part to press the upper against the lateral surface thereof. The male mold part is selected to have a lateral surface which corresponds most closely with the heel end of the last upon which the upper is to be toe and side lasted, and according to the invention there is mounting means for replaceably supporting the male mold part so that the bisecting median of the heel seat surface is aligned with the direction of movement of the female mold part into engagement with the male mold part for both left and right shoes. The mounting means is provided with a coupling which enables both elevating and depressing the male mold part relative to the female mold part and for detaching the male mold part from the support to permit replacement with a mold part of different size, shape or kind. A plate is recessed into the heel seat surface of the male mold part for adjustment lengthwise of the shoe and a pair of spaced parallel pins are fixed to the upper surface of the plate for engagement with correspondingly spaced holes in the insole. A fluid operable motor, from which projects a rod, is provided for effecting forward and rearward movement of the female mold part, and in accordance with another aspect of the invention an improved coupling is employed for connecting the female mold part to the rod to enable ready substitution of one female mold part for another according to the size and kind of the male mold part. The coupling is characterized in that manipulation of a spring-pressed pin permits attachment and detachment without need for a tool. The female mold part is comprised of a back part and two side parts pivotally connected thereto and according to another aspect of the invention the female mold part is supported for forward movement without tilting by engagement of parts extending from the forward ends of the side parts with grooved guides on the support. The grooved guides are designed so that the side parts of the female mold part are withheld during the forward movement of the female mold part until the back part engages the male mold part whereupon the side parts are concomitantly swung inwardly against the sides of the male mold part. The guides are laterally adjustable. There is a wiper carriage mounted for movement parallel to the heel seat surface of the male mold part and the wipers are mounted thereon for pivotal movement parallel to the heel seat surface. In another aspect of the invention the wipers are supported from the carriage by a plate which is fixed transversely but is tiltable about a transverse axis to enable lifting of the forward ends of the wipers as they move forwardly into engagement with the heel end of the male mold part so as to rise over the end onto the upper side of the heel seat surface. Spring means normally yieldably depresses the forward end of the wiper plate to afford an upwiping pressure and there are limit pins for limiting such depression. The wiper supporting plate is also movable downwardly relative to the carriage and there is means for applying added downward pressure to the wipers when needed. A fluid motor, including a piston rod, is arranged to effect forward movement of the wiper carriage and return movement is effected by retraction of the female mold part. In still another aspect of the invention, there is an arm supporting a heater for compound movement from a position laterally above the male and female mold parts to a position vertically above the heel seat surface of the male mold part and downwardly therefrom into a position adjacent the heel seat surface for activating adhesive on the insole.

The invention will now be described in greater detail with reference to the accompanying drawings wherein:

FIG. 3 is a vertical section lengthwise of the unit showing the male mold part in elevation and parts of the driving means in elevation;

FIG. 8 is an elevation of the wipers;

FIG. 9 is an elevation of the wiper-supporting plate;

FIG. 10 is an elevation of the wiper carriage;

FIG. 11 is an elevation of the wiper assembly consisting of the wipers, wiper plate and wiper carriage;

FIG. 12 is a fragmentary section taken on the line 12—12 of FIG. 10;

FIG. 13 is an elevation, partly in section, of the support for the heating element;

FIG. 14 is a fragmentary elevation of the pivotal connection between the heater support and its operating linkage taken on the line 14—14 of FIG. 13.

FIG. 15 is a fragmentary vertical section taken on the line 15—15 of FIG. 14;

FIG. 16 is a fragmentary plan view of the pivotal connection between the heater support and its operating linkage; and FIG. 17 is an elevation taken on the line 17—17 of FIG. 13.

Figure 1:
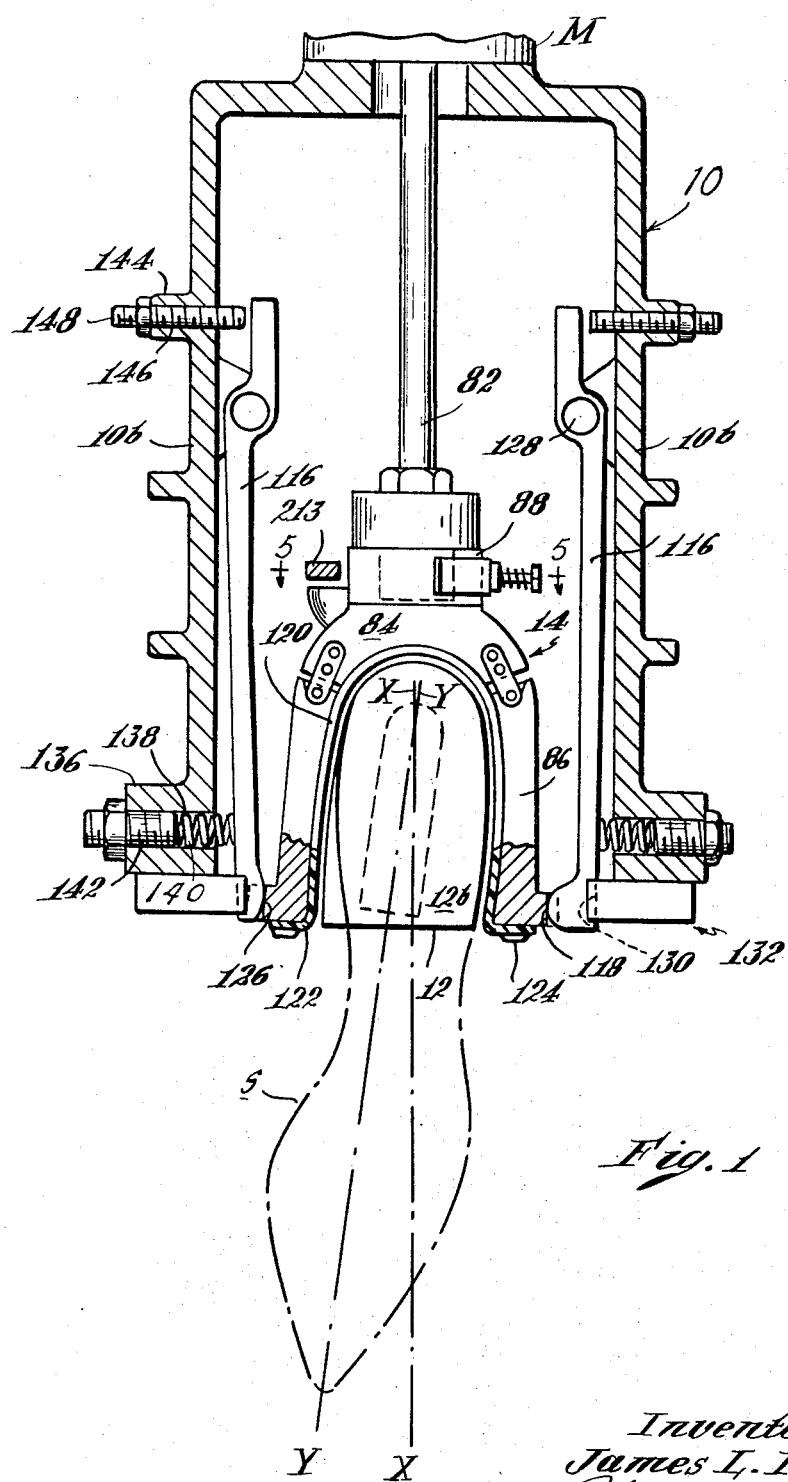
FIG. 1 is a horizontal section of one unit of the back part molding machine with the wiper assembly omitted, showing the orientation of the male mold part relative to the female mold part.

The back part molding and heel seat lasting machine shown herein embodies improvements over such machines as form the subject matter of Patent Nos. 2,915,765 and 3,007,182, and is designed to enable, in particular, practice of the improved method of shoe making disclosed in my pending application Ser. No. 399,203, filed Sept. 25, 1964.

In the aforesaid machines there are a plurality of back part molding and heel seat lasting units arranged around a common center on a support by means of which shaping and lasting can be performed on a plurality of shoes successively. While only one unit is disclosed herein, it is to be understood that there may be a plurality of such units, such as disclosed in the aforesaid patents, arranged for use in succession on a rotatable support such as a table or spider.

As herein shown (FIGS. 1 to 3), each unit comprises a support in the form of a hollow box or cage 10, having a bottom wall 10a and spaced parallel side walls 10b, which is bolted to a rotatable spider or table such as referred to above for rotation about a vertical, horizontal or inclined axis as seems to be most expedient. The box 10 supports a male mold part 12 and a female mold part 14 cooperable with the male mold part to shape, mold, press and smoothly conform an upper placed about the lateral surface of the male mold part to the shape of that surface. As illustrated, the male mold part is supported by its neck 12a in a vertical position with its bottom surface, that is, its heel seat surface 12b uppermost and substantially horizontal, and the female mold part is supported rearwardly of the male mold part for forward movement in a horizontal plane along a straight line toward the rear end of the male mold part.

Figure 2:
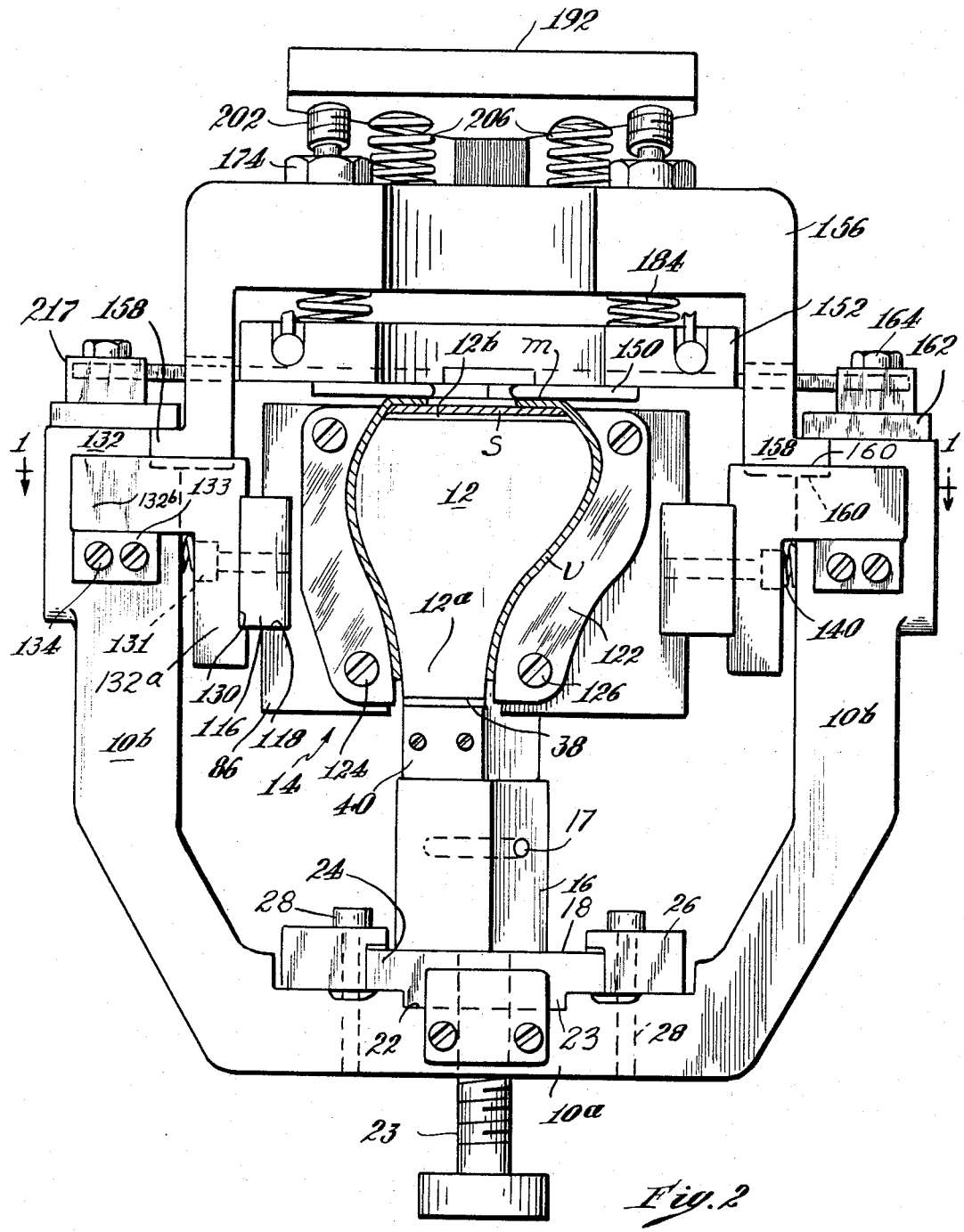
FIG. 2 is a front elevation of the unit shown in FIG. 1, with the wiper assembly included, showing an upper and insole in section.

In accordance with one aspect of the invention, it is desirable to removably and adjustably support the male mold part so as to enable proper orientation of the heel seat surface of the male mold part relative to the female mold part to take care of the eccentricity of the shoe structure; to enable positioning the male mold part at different elevations relative to the female mold part; and to enable replacement of one male mold part for another according to the kind, size and style of shoe being made. The support comprises a block 16 (FIG. 2) secured at its lower end to a plate 18 by bolts 20 (FIG. 3). The plate 18 is mounted on the bottom wall 10a of the box for movement forwardly and rearwardly lengthwise of the box and for clamping in a predetermined position, and has for this purpose, at its lower side, a flat rib 23 slidably engaged with a groove 22 in the bottom wall 10a, and transversely spaced shoulders 24. Clamping blocks 26 recessed at their inner sides to receive the shoulders 24 and provided with screw bolts 28 for attachment to the bottom wall 10a provide for securing the plate 18 to the bottom wall. The block 16 contains a vertically disposed slot 30 (FIGS. 1 and 3) and the male mold part has secured to its neck a tongue 32 interengageable with the slot 30. The neck is releasably retained in the slot by a pin 17 inserted through holes 19 in the block and an enlarged hole 21 in the neck. In order to support the male mold part in its proper position relative to the female mold part, the block 16 is secured to the plate 18 at such an angle that the median line X—X of the heel seat surface of the male mold part, as shown in FIG. 1, is aligned with the direction of movement of the female mold part toward the male mold part. The angular displacement of the male mold part about a vertical axis through the heel seat surface is indicated by the angle between the line X—X (FIG. 1) which represents the bisecting median of the heel seat surface and the line Y—Y which represents the median line from the heel to the toe of the insole. This angle is in the order of 8° and will vary to some extent with lasts of different make and style. Blocks 16 for left and right shoes will, of course, be provided and can be readily replaced one for another by reason of the structure described above.

The male mold part has a curved, lateral or side surface 34, a substantially flat heel seat surface 12b and a flat surface 38 at the end of the neck. The lateral surface 34 is designed to closely approximate the shape of the wood last upon which the upper is to be toe lasted and side lasted following the attachment of the insole thereto in this present machine. Since the depth of uppers vary with the style, size and kind of shoe, the depth of the male mold part must be correspondingly dimensioned and yet it is not desirable to have to keep in stock a great many different size supporting blocks 16. Accordingly, adapter plates 40 (FIG. 3) are provided for interposition between the neck of the male mold part and the supporting block 16 to extend the length of the neck of the male mold part when required the necessary amount, so that when the male mold part is mounted on the block 16 it will be in the proper heightwise position with respect to the female mold part, the height of the latter being, of course, fixed. The adapter plate 40, as shown in FIG. 3, is a flat plate containing threaded openings 42 and is fastened to the neck of the male mold part by bolts 44 which extend through holes 45 drilled through the male mold part from the heel seat surface downwardly to the neck. The ends of the holes adjacent the heel seat surface are countersunk at 46 to receive the heads of the bolts. The tongue 32 is fastened to the adapter plate 40 by bolts 48 extending through countersunk holes in the adapter plate and threaded into the tongue. To obtain rigidity of the connection the lower surface of the adapter plate 40 is provided with a groove 50 interengaged with the upper end of the tongue.

The height of the male mold part is adjustable vertically a slight amount to enable adjusting its heel seat surface relative to the wipers which will be described hereinafter. The vertical adjustment is provided for by a screw 23 (FIGS. 2 and 3) threaded through the bottom wall 10a and through openings into the lower end of the slot 30 in the block 16 against the lower end of the tongue 32. The enlarged hole 21 in the tongue allows an adjustment of the male mold part relative to the block of about 1/16 of an inch.

Figure 7:
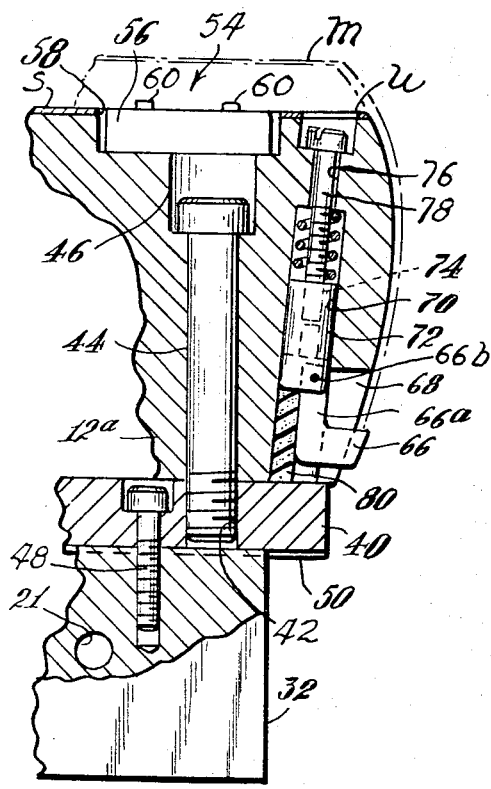
FIG. 7 is a vertical section taken on the line 7—7 of FIG. 6, showing the adjustment for the gauge arm.
Figure 6:
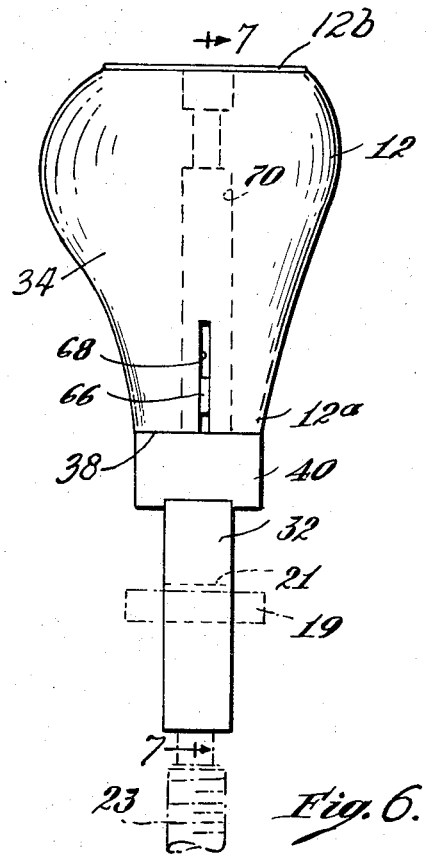
FIG. 6 is an elevation of the back part of the male mold showing the upper gauge arm.

To insure proper positioning of the insole relative to the upper, that is, so that the tip of the insole will coincide with the tip of the upper and the rear end with the rear edge of the heel seat surface, a positioning device 54 is provided which comprises a block 56 set into a recess 58 in the heel seat surface at the heel end as shown in FIG. 7. The block has projecting upwardly from its surface spaced pins 60, the height of which corresponds substantially to the thickness of the insole for engagement with correspondingly spaced holes in the heel end of the insole. While these pins are shown disposed lengthwise of the heel seat surface, they may be disposed transversely thereof or in any other suitable position. The recess is made somewhat longer than the block to afford clearance for movement of the block forwardly and rearwardly therein and is secured within the recess for such movement by the provision of slots 62 in the block and screw bolts 64 inserted through the slots and threaded into the body of the male mold part.

In order to adjust the heightwise position of the upper on the male mold part so that proper engagement of the male and female mold parts will be realized and so that the proper amount of lasting margin will project upwardly beyond the heel seat surface, a gauge is provided, as shown in FIG. 7, comprising an arm 66 extending rearwardly from the male mold part through a vertical slot 68 situated adjacent the neck of the male mold part which extends inwardly from the surface into a bore 70. The bore 70 extends from the heel seat surface downwardly toward the neck and has slidably disposed in it a support 72, to the lower end of which is pivotally connected the gauge arm 66. The upper end of the support contains a threaded hole 74 and the bore contains a restriction 76 through which a bolt 78 is inserted and threaded into the hole 74. The head of the bolt 78 is recessed in the upper end of the bore and by rotation is operable to move the support 72 lengthwise of the bore and hence to move the gauge arm 66 heightwise of the male mold part. The gauge arm 66 has a right-angularly extending limb 66a by means of which it is pivotally supported from the lower end of the support on a pin 66b. A yieldable element 80 in the form of a rubber strip is placed behind the limb 66a so as normally to hold the arm extended from the slot. A coiled spring 81, disposed about the bolt 78, holds the support at the lower end of the bore. Forward movement of the female mold part into engagement with the male mold part will force the gauge arm into the slot so that it will not interfere with proper engagement of the mold part.

Figure 4:
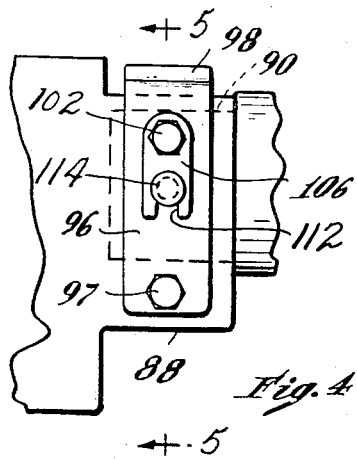
FIG. 4 is a fragmentary elevation to much larger scale, showing the connection between the female mold part and the driving means therefor.
Figure 5:
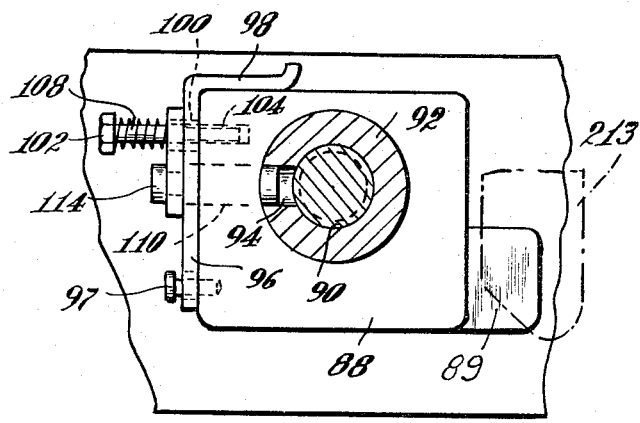
FIG. 5 is a fragmentary elevation showing portions of the connection in section taken transversely of the connection on the line 5—5 of FIG. 4.

The female mold part 14, as previously explained, is movable forwardly and rearwardly in a horizontal plane from a position rearwardly of the male mold part forwardly into engagement with an upper placed about the male mold part. Movement is effected by a fluid operable motor M, a fragmentary portion of which is shown in FIGS. 1 and 3, bolted to the rear end of the box 10. The motor has projecting forwardly from it a piston rod 82 to which the female mold part is connected. To enable easily replacing the female mold part so as to match the male mold part, the rear part of the female mold part, which comprises a rear part 84 and side parts 86 pivotally connected thereto, is provided with a rearwardly projecting boss 88 (FIGS. 4 and 15) containing a cylindrical bore 90. A bushing 92 is secured to the forward end of the piston rod 82 which is adapted to fit into the bore 90 and contains a radial hole 94. The boss 88 is of substantially rectangular cross-section and contains a hole 110 through one wall into the bore with which the radial hole 94 in the bushing may be aligned to receive a removable locking pin 114. The locking pin 114 is supported by an arm 96, one end of which is loosely secured to the boss by a screw bolt 97 and the other end of which has a right-angularly bent part 98 engaged with the top side of the boss by means of which the arm may be pulled outwardly away from the boss. The arm 96 contains a hole 100 through which a screw bolt 102 is loosely inserted and threaded into a threaded hole 104 in the boss 88. A plate 106 is mounted on the screw bolt and yieldingly held engaged with the arm by means of a spring 108 placed on the bolt between it and the head of the bolt. The plate 106, in turn, contains a notch 112 which is engaged with the head of the locking pin 114. When the locking pin 114 is engaged with the hole 94 in the bushing, it prevents rotation of the bushing and hence of the rod 82 in the motor cylinder M and thus prevents tilting of the female mold part during its linear movement. The foregoing also provides for readily detaching the female mold part from the piston rod by the simple expedient of withdrawing the locking pin 114 from the hole 94 in the bushing. The locking pin is normally held in place by the spring 108 however the latter will yield under pressure and the part 98 of the arm provides convenient means for pulling the arm and hence the pin outwardly and holding it retracted until it is desirable to reconnect the female mold part to the rod.

The female mold part, which is comprised of the articulated parts 84 and 86 (FIG. 1), is further supported for movement without tilting by spaced guide bars 116 mounted adjacent the side walls 10b of the box 10. The forward ends of the side parts 86 contain at their outer sides slots 118 slidably engaged with the inner edges of the guide bars 116. The slotted portions of the side parts 86 are maintained in engagement with the inner edges of the guide bars 116 throughout movement of the female mold part forwardly and rearwardly by distension of the parts 86 produced by the resilient lining 120 applied to the inner side of the part which tends to spread the side mold parts 86 outwardly relative to the back part 84. This lining is comprised, for example, of Teflon which has a smooth, somewhat glossy and/or greasy surface, is continuous over the three parts of the mold and is fastened at the mouth of the mold by outturned flange portions 122 which are secured to the forward ends of the parts 86 by bolts 124. The lining may optionally be leather and spring means may be employed to distend the parts as shown in Patent No. 3,017,645.

Both the mold parts and the lining member are shaped to conform precisely to the exterior lateral surface of the male mold part. The guide bars 116 are supported in such relation that throughout the major portion of the movement of the female mold part forwardly into engagement with the male mold part, the side parts 86 remain distended and do not rub against the sides of the male mold part. At the forward extremity of movement, concomitantly with the engagement of the rear part 84 with the upper on the male mold part, cam elements 126 on the inner sides of the guide bars 116 force the parts 86 inwardly about their pivot pins into engagement with the sides of the upper at the sides of the pivot pins.

The guide bars 116 are supported on the side walls 10b of the box 10 on pivot pins 128 (FIG. 1) for swinging about vertical axis. The forward ends of the guide bars 116 are rigidly supported so as to retain their horizontal position by brackets 132. The brackets 132 have vertically depending parts 132a which contain slots 130 into which the outer sides of the guide bars 116 are fitted and fastened by screw bolts 131. The brackets 132 also have horizontal parts 132b and these rest on and are supported by blocks 133 fastened to the forward ends of the side walls 10b by bolts 134. The guide bars are thus movable laterally outward about the pivot pins 128. The side walls 10b have near their forward ends bosses 136 (FIG. 1) containing bores 138 in which are placed coiled springs 140. The bores 138 extend through the side walls and the springs bear at their inner ends on the outer sides of the guide bars 116 thus forcing them inwardly toward each other. Adjusting screws 142 are threaded into the bosses outwardly of the spring and provide means for adjusting the resistance of the guide bars to outward displacement. Rearwardly of the pivot pins 128 there are additional bosses 144 containing threaded holes 146 in which are threaded adjusting pins 148, the inner ends of which have contact with the outer sides of the guide bars 116. The pins 148 provide for limiting inward movement of the guide bars. Rotation of the screws 148 also permits adjusting the spacing of the forward ends of the guide bars for mold parts of different size.

The upper U (FIG. 7) is placed about the outer surface of the male mold part with its upper edge m projecting above the heel seat surface, the proper amount being determined by adjustment of the gauge arm 66, and following engagement of the female mold part with the upper so as to shape it and conform it smoothly to the surface of the male mold part, the upwardly projecting lasting margin m is wiped inwardly by wipers and secured to an insole s placed with its heel end on the heel seat surface and retained in this position by the positioning pins 60. Wiping is obtained by means of a pair of pivoted wiper blades 150, such as shown in FIG. 8. These wiper blades are pivotally mounted at the lower side of a wiper plate 152 (FIG. 9) at the lower end of a pin 154 secured in the plate. The wiper plate 152 is, in turn, supported by a wiper carriage 156 (FIG. 10). The wiper carriage 156 has transversely spaced, parallel edges 158 which are slidably supported on spaced parallel shoulders 160 along the tops of the side walls 10b, by means of overlapping gibs 162 fastened to the upper edges of the walls by bolts 164. The wiper plate 152 is suspended from the carriage 156 by a pair of bolts 166 (FIG. 12). The bolts 166 are mounted in vertical holes in hollow bushing elements 168 and these, in turn, are threaded into a horizontally disposed spindle 170 mounted in a horizontal hole 172 in the carriage for rotation about a horizontal axis transversely of and parallel to the heel seat surface. The bolts 166 are freely slidable axially in the bushings, their heads 174 being recessed into the upper ends of the bushings and their lower ends being threaded at 176 and screwed into the wiper plate 152. A clearance 178 is provided in the carriage at the upper ends of the bushings and a clearance 180 is also provided at the lower ends of the bushings, so that the spindle 170 and hence the bolts supporting the wiper plate 152 may be rotated angularly about the axis of the spindle to tilt the wiper plate 152, as shown in FIG. 12. The spindle 170 permits the wiper plate 152 to tilt about a transverse axis, but prevents its tilting about a longitudinal axis. The carriage 156 is provided with vertically disposed threaded openings 182 in which there are disposed coiled springs 184, with their lower ends bearing on the upper side of the wiper plate. Adjusting screws 186 are threaded into the upper ends of the openings 182 for adjusting the spring compression and hence the pressure which may be applied to the wiper plate 152 to hold it spaced downwardly from the lower side of the carriage. By providing a suitable amount of pressure on the springs 184, when the wiper carriage is moved forwardly the forward ends of the wipers will provide an upwiping action as they engage and move upwardly onto the upper side of the heel seat surface. Preferably a greater pressure is applied to the wiper plate forwardly of the spindle 170 than at the rear, so that the forward end of the plate and hence of the wipers tilts downwardly somewhat thus enhancingt he wiping action as the wipers are brought into engagement with the heel end. To limit the action of the springs, limiting screws 188 (FIG. 3) are threaded through a plate 189 fastened to the rear end of the carriage by bolts 191 for engagement with the rear edge of the wiper plate 162. Nuts 190 are provided for locking the screws 188 in an adjusted position. The wiper plate contains holes 191 for receiving heating cartridges if heat is required for obtaining good wiping action. As stated above, when the wipers move upwardly onto the surface of the heel seat, the wiper plate yields upwardly toward the carriage, compressing the springs 184 to some extent. Under certain circumstances, for example where very stiff or stubborn upper material is employed, as in the manufacture of heavy work shoes, it is desirable to apply even more pressure than is provided for by compression of the spring. Accordingly, an auxiliary pressure-applying device is mounted on the wiper carriage which may or may not be used as desired. As illustrated, the auxiliary pressure-applying device (FIGS. 3, 11 and 12) comprises a lever 192 pivotally supported on a pin 194 by means of which it is removably secured to the upper side of the carriage. The lever has a forwardly extending arm 198 containing threaded holes 200 (FIG. 3) in which there are threaded screws 202, the lower ends of which bear against the heads 174 of the bolts 166. The heightwise position of the screws 202 may be adjusted by rotation and lock nuts 204 provide for fixing them in predetermined positions of adjustment. Rearwardly of the screws 202 coiled springs 206 are mounted between the arm 198 and the carriage which normally hold the lower ends of the screws 202 out of engagement with the heads 174 of the bolts 166, or at least if in contact therewith not under pressure. The lever 192 has a rear face 206 (FIG. 3) adjacent the plate 189 and the latter, in turn, has a hole 208 therein in which is loosely mounted a pin 210 having a head 212 adapted to bear against the face 206. A rod 214 extending from a fluid motor M1 and having at its forward end a circular head 216 is provided for moving the carriage forwardly into operative position by engagement with the plate 189. The head 216 is radially large enough so that a portion of it engages the pin 210 and when the carriage is moved forwardly to its forwardmost position and stopped by engagement with the forwardly mounted limit stops 217 secured to the side walls of the box, added pressure applied to the pin 210, which is slightly longer than the hole 208, will rock the lever 192 in a counterclockwise direction, as shown in FIG. 3, so as to depress the screws 202 and force the bolts 166 and hence the wiper plate 152, attached to their lower ends, downwardly to apply a considerable amount of added pressure, which will be multiplied by the lever action shown, to the wiped-in margin of the upper.

The lasting margin m of the upper at the heel end is attached by means of adhesive and in the preferred form of the invention the adhesive is preapplied to the marginal edge of the insole at the heel end and normally is hard and non-tacky, thus enabling stacking, storing and handling of the inner soles without their sticking to each other or of accumulating dirt, dust and the like. The adhesive, accordingly, must be activated preparatory to the wiping operation and preferably within a very few seconds before such wiping since the adhesive itself is a quick-setting material so that the shoe need not have to be left in the machine for any appreciable length of time following the wiping-in operation. Accordingly, a heating device 220 (FIG. 13) is provided which is adapted to be moved from a position at one side of the male and female mold parts to a position above the heel seat surface of the male mold part and then vertically downward into a position close to the upper surface of an insole resting on the heel seat surface for the purpose of softening the adhesive thereon. The compound movement of the heater first inwardly and then downwardly is required to enable inserting the heating element into position within the upstanding lasting margin m of the upper without accidentally folding the margin or depressing it so that it will become prematurely attached without being lasted. The heating element is in the form of a heel plate 222 containing in its underside a U-shaped groove 224 in which there is inserted a heating element 226. At the rear end of the plate 222 and at its forward end at opposite sides, there are projections 228 (FIGS. 13 and 17) containing vertically threaded holes in which are screwed gauge screws 230, by means of which the proper location of the upper edge of the lasting margin m may be determined in conjunction with the height gauge 66 or independently thereof. The plate 222 is secured by a screw 232 to one end of an arm 234, the other end of which is rotatably clamped by means of a clamping element 236 to the forward end of a rod 238. The rear end of the rod 238 is rotatably retained in a sleeve 240, the latter being pivotally supported on a bracket 244 for rotation about a vertically disposed pin 246 in a plane parallel to the heel seat surface of the male mold part. A spring 248 is mounted on the rod 238 with one end fastened thereto by a screw 250 and the other end anchored in a hole 252 in the sleeve. The spring 248 normally urges the rod 238 to turn in a counterclockwise direction as viewed in FIG. 13 and thus to rotate the arm 234 in a direction to move the heater toward the heel seat surface of the male mold part. The sleeve has a part 254 extending rearwardly from the pivot pin 246 (FIG. 16) to which is pivotally connected one end of an operating linkage 256. The linkage comprises telescoping parts 258 and 260 interconnected by means of a pin 262 in the part 258 which extends through a slot 264 in the part 260. A spring 266 holds the parts distended. The outer end of the part 258 is pivotally connected by a pin 268 to the part 254. The outer end of the part 260 is pivotally connected by a pin 270 to the forward end of a piston rod 272 projecting from a fluid motor M2. To provide for the compound movement referred to above, the part 260 has on its forward end a limb 274 (FIGS. 14 and 15) which is parallel to the part 258 and the rod 238 has at its rear end a lever arm 276 which projects through a slot in the sleeve 240 into the path of the limb 274. During the initial forward movement of the linkage the normally distended telescoping parts serve only to swing the rod 238 about the pivot pin 246, from its normal position to a position above the heel seat surface. During this movement the arm 234 is elevated by reason of the coiled spring 248. When the arm reaches its inward position above the heel seat surface, further movement telescopes the parts bringing the end of the limb 274 into engagement with the bracket arm 276 thereby rotating the rod 238 and lowering the heater into a position close to the heel seat surface, so that the heat from the heating element will activate the adhesive. The movement of the heater into and out of operative position is controlled so that it is withdrawn just before the wiper assembly is moved forwardly for the wiping operation. A screw 278, supported by a part 280 adjacent the inner end 254 of the sleeve for contact with the part as the latter is moved in a clockwise direction about its pivot, provides for accurately positioning the heater above the heel seat surface.

The component parts of the machine as herein shown are motivated by means of fluid pressure operated motors, there being a motor M for advancing and retracting the female mold part; a motor M1 for advancing a wiper assembly, the latter being retracted by a part 213 depending from the carriage behind a lug 89 projecting laterally from the boss 88; and a motor M3 for advancing and retracting the linkage 256 which controls movement of the heater. It is to be understood however that means other than fluid operable motors may be employed for the foregoing purposes and that all equivalent means for effecting the desired movement is intended to be within the scope of the invention as herein illustrated.

It should be understood that the present disclosure is for the purpose of illustration only and that this invention includes all modifications and equivalents which fall within the scope of the appended claims.

I claim:

1. In a machine for preshaping the heel end of an upper to a last for shoe making, a support, a male mold part and female mold part mounted on the support for relative movement to bring the female mold part and male mold part together to shape an upper to the surface of the male mold part, a block removably secured to the support, said block containing a slot, a tongue on the neck of the last interengageable with the slot to hold the male mold part with the median line bisecting the heel seat surface at an angle such that it is aligned with the direction of movement of the parts, said tongue containing a transverse hole, a pin of smaller diameter than the hole situated in the hole transversely of the slot with its ends supported in the walls of the slot, and an adjusting screw bearing against the lower end of the neck operable to raise and lower the male mold part by an amount corresponding to the difference in diameter of the hole and pin.

2. In a machine for preshaping the heel end of an upper to a last for shoe making, a support, a male mold part and female mold part mounted on the support for relative movement to bring the female mold part and male mold part together to shape an upper to the surface of the male mold part, a block removably secured to the support, said block containing a vertical slot, a tongue secured to the neck of the last for interengagement with the slot in the block to permit interchanging the male mold part, said block and tongue containing transversely disposed holes, the hole in the tongue being of larger diameter than the holes in the block, a pin removably mounted in the holes, said pin corresponding in diameter to the holes in the block and being smaller than the holes in the tongue, said male mold part being movable to raise and lower it relative to the female mold part by an amount corresponding to the difference in the diameter of the hole and pin, the top of the hole in the tongue bearing on the pin when the male mold part is at its lowermost position and the bottom bearing on the pin when the male mold part is in its uppermost position, and an adjusting screw threaded through the block into engagement with the lower end of the neck operable to raise and lower the male mold part relative to the female mold part.

3. In a machine for preshaping the heel end of an upper to a last for shoe making comprising a support, a male mold part and a female mold part mounted on the support for relative movement to bring the female mold part and male mold part together, said female mold part being mounted on the support for movement in a fixed plane, a block for removably supporting the male mold part at a level such that its exterior curved surface will mate with the interior curved surface of the female mold part when the parts are moved together, said block containing a slot, a tongue secured to the neck of the last for interengagement with the slot in the block to removably hold the male mold part on the support, and an adapter member interposed between the neck and the tongue to compensate for lasts having different perpendicular dimensions such that only one size block of predetermined height is required.

4. In a machine for preshaping the heel end of an upper to a last and heel seat lasting the upper to an insole while the upper is held so shaped, a male mold part having a curved side surface corresponding in shape to the heel end of the last upon which the upper is to be lasted, and a heel seat surface upon which the heel end of an insole is adapted to be placed within the upstanding peripheral margin of an upper wrapped around the male mold part; means for locating the insole on the heel seat surface comprising a plate fitted into the bottom of the male mold part flush with the heel seat surface, a pair of spaced pins fixed to and extending upwardly from the plate, the length of said pins being approximately the thickness of the insole, and means for securing the plate to the bottom of the male mold part for adjustment forwardly and rearwardly relative to the longitudinal median of the heel seat.

5. A male mold part having a curved side surface, a heel seat surface and a neck, said male mold part containing a bore, the axis of which coincides with the median plane perpendicular to the heel seat surface and which extends from the heel seat surface toward the neck, and a slot in the neck which extends from the rear of the side surface into the bore, a support mounted in the bore, said support containing a threaded hole, a screw threaded into the support operable to move the support along the bore, and a gauge arm mounted on the support with an end projecting outwardly through the slot, said gauge arm being movable relative to the heel seat surface by rotation of the screw.

6. A male mold part according to claim 5, wherein a yieldable member is disposed in the bore behind the arm for yieldably holding the arm extended from the slot, said arm being yieldably displaceable into the slot by engagement of the female mold part therewith when the latter is moved into engagement with the mole mold part.

7. In a back part molding machine, a support, a male mold part and a female mold part mounted on the support for relative movement of the parts into engagement to shape an upper placed about the male mold part, said male mold part being fixed with respect to said relative movement, a reciprocable rod on the support supporting the female mold part for movement, a bushing fixed to the forward end of the rod, said bushing containing a radial hole, said female mold part containing a recessed part for receiving the bushing and a hole through it aligned with the hole in the bushing, and a locking pin removably supported in the aligned holes.

8. In a back part molding machine, a support, a male mold part and a female mold part mounted on the support for relative movement of the parts into engagement to shape an upper placed about the male mold part, said male mold part being fixed with respect to said relative movement, a reciprocable rod on the support, said rod containing at its forward end a radial hole, said female mold part having a recessed part for receiving the end of the rod which contains a hole aligned with the hole in the rod, an arm loosely fastened to the recessed part, said arm containing a hole alignable with the hole in the recessed part, a locking pin extending through the hole in the arm and the hole in the recessed part into the hole in the rod, and means yieldingly supporting the arm with the locking pin engaged with the hole in the rod, said arm being manually movable to withdraw the locking pin from the hole in the rod to release the end of the rod from the recessed part.

9. In a back part molding machine, a support, a male mold part on the support, a female mold part adapted to be moved from a position rearwardly of the male mold part into engagement with an upper wrapped about the male mold part, said female mold part comprising articulated back and side parts, said side parts being normally distended, a pair of spaced guide bars on the support, means on the side parts of the female mold part slidably engaged with the guide bars for movement of the female mold part forwardly toward the male mold part, the transverse spacing of said guide bars being such that the side mold parts of the female mold part retain their distended relation during forward movement of the female mold part until the back part engages the back of the male mold part, and means on the guide bars operable, concurrently with the engagement of the back part of the female mold part with the male mold part, to swing the side mold parts about their axes of articulation into engagement with the sides of the male mold part.

10. Apparatus according to claim 9, comprising pivot pins supporting the guide bars for swinging movement toward each other about spaced axes perpendicular to the bottom of the heel seat surface of the male mold part, springs bearing against the forward ends of the guide bars forwardly of the pivot pins urging the forward ends toward each other, and adjustable screws bearing against the rear ends of the guide bars, rearwardly of the pivot pins, limiting inward movement of the guide bars.

11. In a back part molding machine, a support, a male mold part on the support, a female mold part adapted to be moved from a position rearwardly of the male mold part into engagement with an upper wrapped about the male mold part, said female mold part comprising articulated back and side parts, said side parts being normally distended, a pair of transversely spaced guide bars pivotally mounted for swinging movement about axes perpendicular to the heel seat surface of the male mold part, said female mold part being slidably supported between the guide bars, spring means yieldably urging the guide bars forwardly of their pivots into engagement with the female mold part, adjustable screws bearing on the guide bars, rearwardly of their pivots, limiting such pivotal movement, and adjustable screws bearing on the spring means operable to increase the pressure of said springs on said guide bars.

12. In a back part molding machine, a support, male and female mold parts mounted on the support for relative movement to mold an upper to the male mold part, wiper-supporting means and means for advancing the wiper-supporting means forwardly to close the wipers above the heel seat surface of the male mold part, said wiper-supporting means comprising a rigid carriage supported for movement parallel to the heel seat surface of the male mold part, a wiper plate to which the wipers are pivotally mounted for swinging movement in a plane parallel to the heel seat surface, means supporting the wiper plate for yielding engagement with the heel seat surface, and auxiliary means adapted to be mounted on the carriage with a part engaged with said wiper-supporting means, operable to apply added pressure to said yielding pressure, said auxiliary means being operable, by the means for effecting forward movement of the wiper-supporting means, when the latter reaches its forward position.

13. In a back part molding machine, a support, male and female mold parts mounted on the support for relative movement to mold an upper to the male mold part, wiper-supporting means comprising a wiper carriage supported for movement parallel to the heel seat surface of the male mold part, a wiper plate to which the wipers are pivotally mounted for swinging movement in a plane parallel to the heel seat surface, a spindle mounted on the carriage for rotation about a horizontal axis parallel to the heel seat surface, a pair of transversely spaced hollow bushing elements threaded through the spindle, bolts extending through the bushings with their lower ends threaded into the wiper plate, said bolts being tiltable about the axis of the spindle and axially movable lengthwise of the bushing, and means adapted to be brought to bear on the upper ends of the bolts, operable to apply downward pressure to said bolts.

14. In a back part molding machine, a support, male and female mold parts mounted on the support for relative movement to mold an upper to the male mold part, pivotally mounted wipers adapted to be moved parallel to the heel seat surface of the male mold part to wipe the projecting margin of the upper into engagement with the heel end of an insole resting on the heel seat surface, wiper-supporting means comprising a rigid carriage supported for movement parallel to the heel seat surface, means for effecting forward movement of the carriage parallel to the direction of movement of the female mold part to advance the carriage from a position rearwardly of the male mold part to a position above it, a wiper plate to which the wipers are pivotally mounted for swinging movement in a plane parallel to the heel seat surface, means supporting the wiper plate on the carriage for movement relative to the carriage, springs situated between the wiper plate and the carriage holding the wiper plate spaced from the carriage, said wiper plate being yieldable as it is moved over the heel seat surface, a lever pivotally mounted on the carriage with one end bearing on the means supporting the wiper plate on the carriage, operable to depress said means, and means operable, by movement of the carriage into position above the heel seat surface, to rock the lever.

15. In a back part molding machine comprising male and female mold parts relatively movable to mold an upper to the male mold part, said male mold part having a heel seat surface for receiving the heel end of an insole to which the lasting margin of the upper is to be secured by wiping, a heating element, and means for moving the heating element into and out of operative position above the insole resting on the heel seat surface to activate adhesive on said insole, comprising a part pivoted at one end for movement in a plane parallel to the heel seat surface, an arm mounted on the part for rotation in a plane perpendicular to the heel seat surface, said heating element being secured to the distal end of the arm for movement therewith to a position above the heel seat surface, means urging the arm to rotate in a direction to lift the heating element away from the heel seat surface, means operating to swing the pivot part and hence the arm from a lateral position toward the heel seat surface, and means operative, as the arm is moved to a position above the heel seat surface, to rotate the arm in a direction to lower the heating element toward the heel seat surface.

16. A back part molding machine comprising male and female mold parts relatively movable to mold an upper to the male mold part, said male mold part having a heel seat surface for receiving the heel end of an insole to which the lasting margin of the upper is to be secured by wiping, a heating element, and means for moving the heating element into and out of operative position above the insole resting on the heel seat surface to activate adhesive on said insole, comprising an arm supported for pivotal movement about an end and rotational movement about its axis, said arm supporting the heating element at its distal end, means for effecting pivotal movement of the arm from a position in which the distal end is withdrawn to one side of the male mold part to a position in which it is above the heel seat surface, spring means normally operating on the arm to lift the heating element away from the heel seat surface, and means operative on the arm, as the arm is moved to position the heating element above the heel seat surface, to depress the heating element toward the heel seat surface in opposition to said spring means.

17. Apparatus according to claim 16, wherein there is an adjustable part operative to limit pivotal movement of the arm to a position in which the heating element is vertically above the heel seat surface.

18. A back part molding machine comprising male and female mold parts relative movable to mold an upper to the male mold part, said male mold part having a heel seat surface for receiving the heel end of an insole to which the lasting margin of the upper is to be adhered, a heating element, and means for moving the heating element into and out of operative position above the insole resting on the heel seat surface, comprising a rod supported at one end for swinging movement in a plane parallel to the heel seat surface and for rotation about its longitudinal axis, a radially extending arm secured to the distal end of the rod, said heating element being mounted on the distal end of the radial arm, a spring coiled about the rod operating to rotate the rod in a direction to lift the heating element away from the heel seat surface, a link pivotally connected to the proximal end of the arm operative to swing the distal end of the arm toward and away from the male mold part, and means on the link and rod cooperable concomitantly with the movement of the heating element into a position above the heel seat surface to rotate the rod in a direction to depress the heating element toward the heel seat surface.

19. In a back part molding machine comprising male and female mold parts relatively movable to mold an upper to the male mold part, said male mold part having a heel seat surface for receiving the heel end of an insole to which the lasting margin of the upper is to be attached, a heating element, and means for moving the heating element into and out of operative position above the insole resting on the heel seat surface, comprising a rod supported at one end for swinging movement in a plane parallel to the heel seat surface and for rotation about its longitudinal axis, a radially extending arm secured to the distal end of the rod, said heating element being mounted at the distal end of the arm, a spring coiled about the rod operative to rotate the rod in a direction to lift the heating element away from the heel seat surface, linkage for effecting swinging movement of the rod comprising telescoping parts, means holding the parts distended, one of said parts being pivotally connected to said rod and the other to means for effecting linear movement of the linkage to swing the rod about its pivot, and means on one of the telescoping parts movable, by telescoping movement of the parts when the rod reaches a predetermined limited position to rotate the rod about its axis.

20. In a machine for preshaping the heel end of an upper to a last for shoe making, a support, a male mold part and female mold part mounted on the support for relative movement along a straight line to bring the female mold part and the male mold part together to shape and upper to the surface of the male mold part, replaceable blocks adapted to be removably secured to the support, one for left and one for right shoes, and a tongue on the male mold part removably interengageable with the block being used to hold the male mold part with the median bisecting the heel seat surface at an angle such that it is in alignment with the direction of movement of the parts.

21. In a machine for preshaping the heel end of an upper to a last for shoe making, a support, a male mold part and female mold part mounted on the support for relative movement along a straight line to bring the female mold part and male mold part together to shape and upper to the surface of the male mold part, a block removably secured to the support, a tongue on the male mold part removably interengageable with the block to hold the male mold part with the median bisecting the heel seat surface at an angle such that it is in alignment with the direction of movement of the parts, and means for adjusting the male mold part on the block to raise or lower it relative to the female mold part.

22. In a back part molding machine, a male mold part and female mold part adapted to be moved from a position rearwardly of the male mold part into engagement with an upper wrapped about the male mold part, said female mold part comprising articulated back and side parts, a resiliently elastic lining member coextensive with the inner side of the back and side parts of the female mold part, said lining member holding the side parts distended relative to the back part, during forward movement of the female mold part, into a position of engagement of the back part of the female mold part with the upper on the male mold part so that the side parts of the female mold part do not rub against the sides of the male mold part during such forward movement of the female mold part, and means operable, concomitantly with the engagement of the back part of the female mold part with the upper on the male mold part, to bring the side parts of the female mold part into yielding engagement with the sides of the male mold part.

23. A back part molding machine according to claim 22, wherein the lining member is comprised of Teflon premolded to the contour of the inner surface of the female mold part.

References Cited

UNITED STATES PATENTS

| | | | |
|---|---|---|---|
| 1,726,833 | 9/1929 | Holmgren | 12—54.3 |
| 2,342,154 | 2/1944 | Macdonald | 12—54.3 |
| 2,449,216 | 9/1948 | Gordon et al. | 12—14 |
| 2,915,765 | 12/1959 | Lauretti | 12—54.3 |
| 3,138,810 | 6/1964 | Becker | 12—54.3 X |
| 3,238,545 | 3/1966 | Stambaugh et al. | 12—54.3 |

PATRICK D. LAWSON, *Primary Examiner.*